Patented Sept. 21, 1937

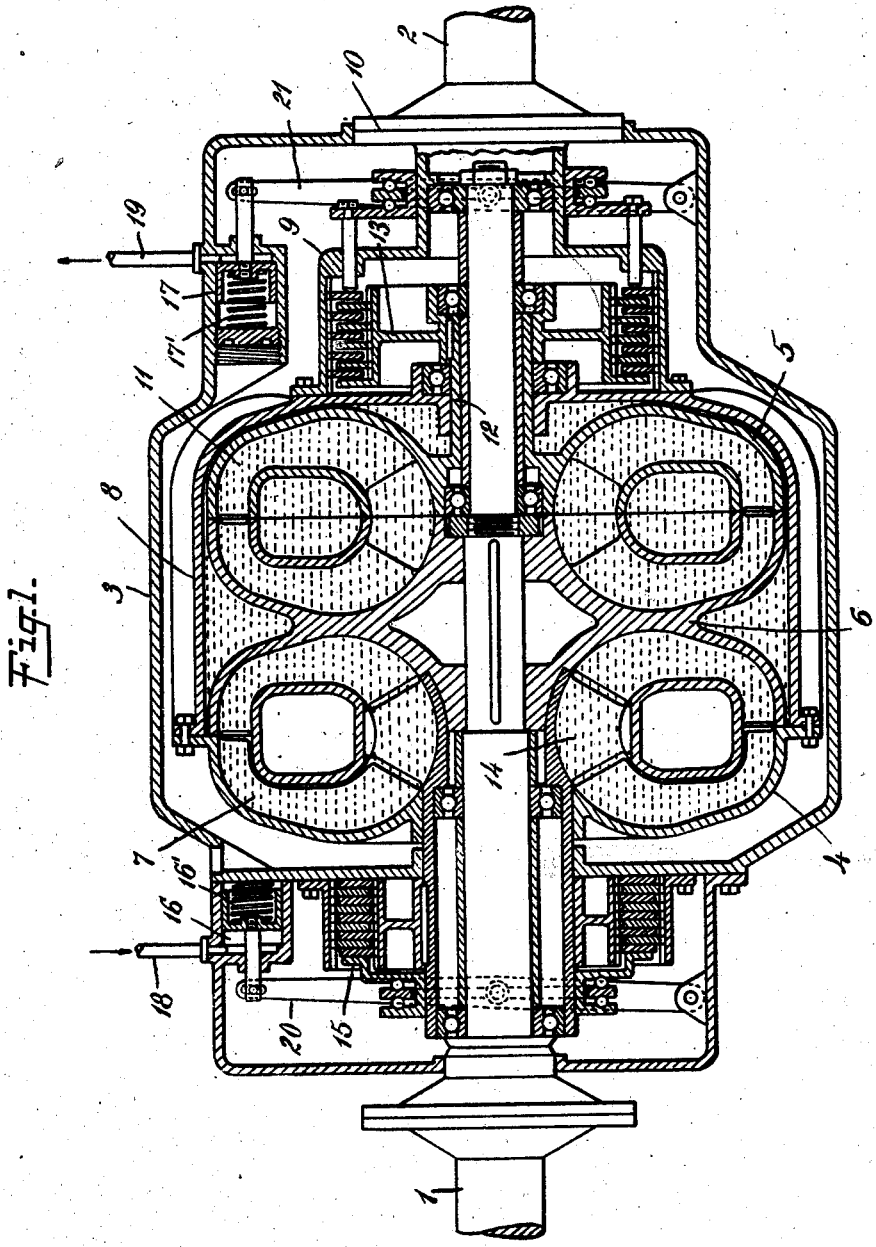

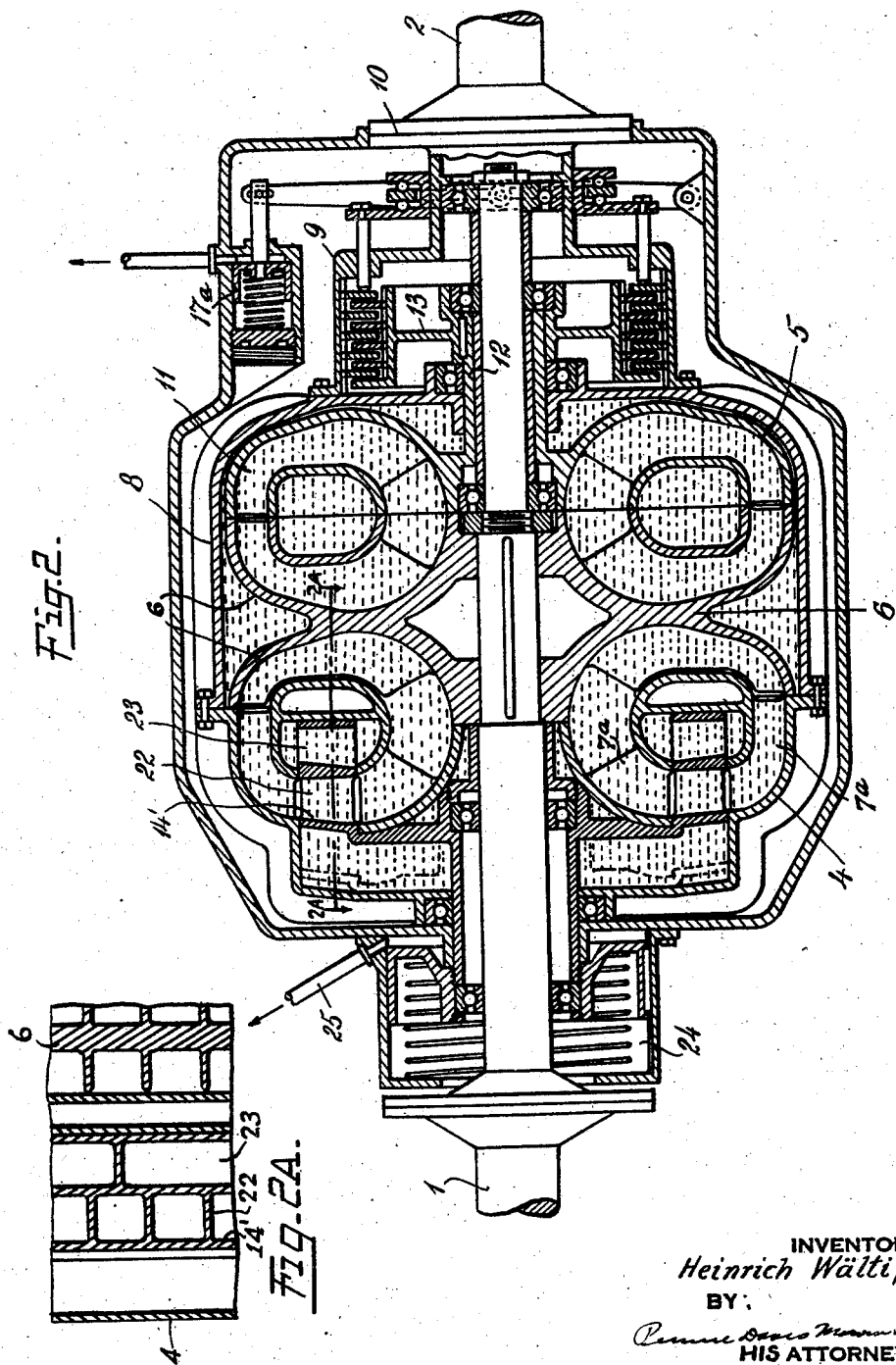

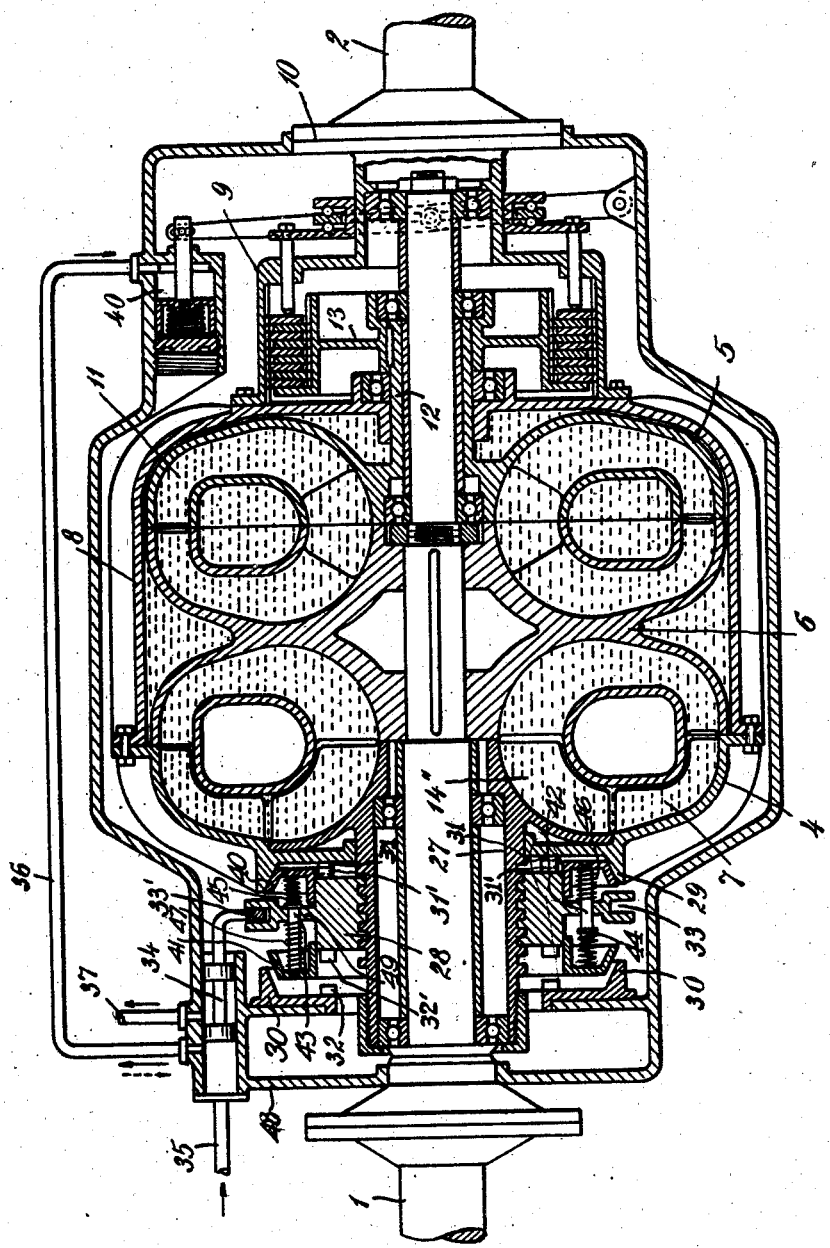

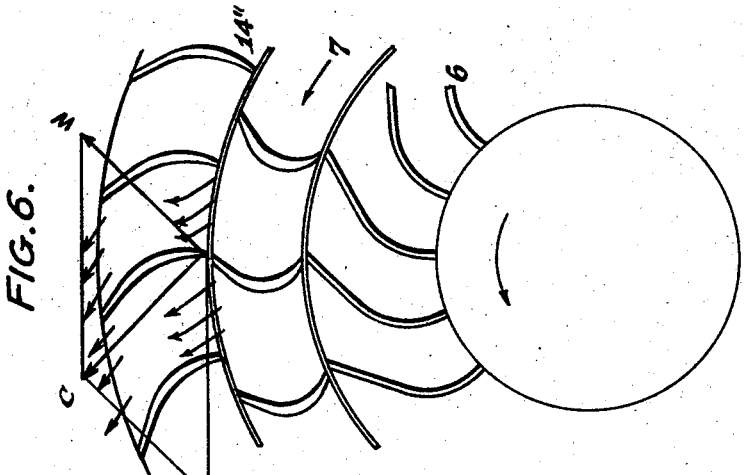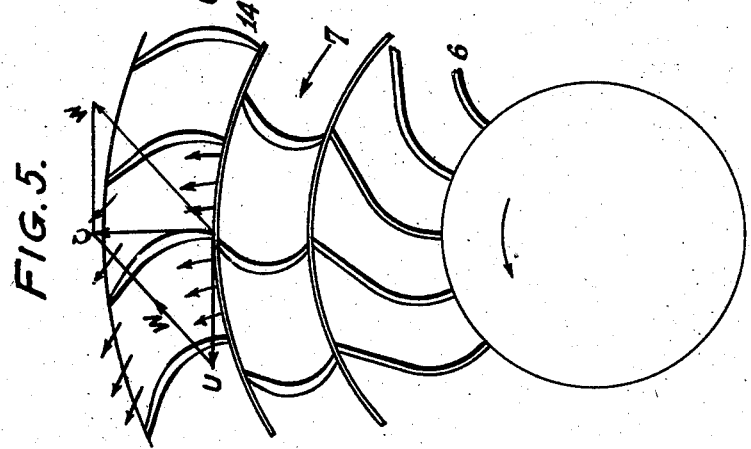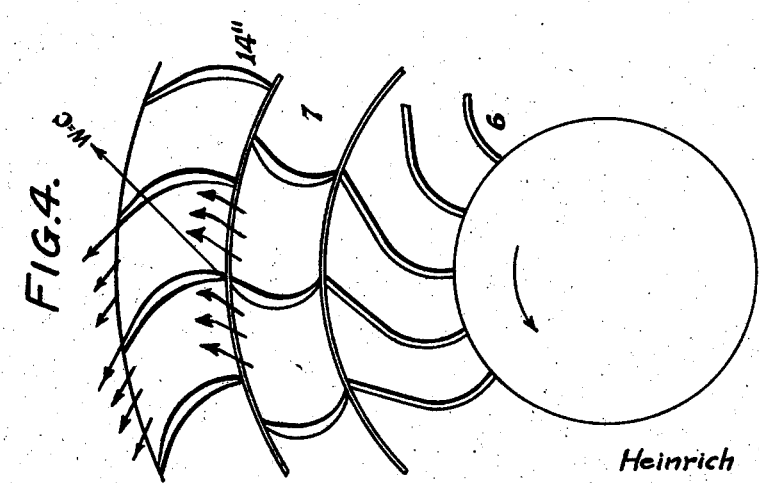

2,093,498

UNITED STATES PATENT OFFICE 2,093,498

HYDRAULIC TRANSMISSION OF POWER BY HYDRAULIC CHANGE SPEED GEARS

Heinrich Wälti, Winterthur-Wulflingen, Switzerland

Application June 9, 1934, Serial No. 729,833
In Switzerland December 21, 1933

14 Claims. (Cl. 60—54)

This invention relates to the hydraulic transmission of power; more particularly, to hydraulic change-speed gear of that kind which includes a hydraulic torque-transformer and a hydraulic coupling.

Though hydraulic change-speed gear has heretofore been proposed involving a hydraulic torque-transformer and a hydraulic coupling, it has been inevitably necessary to delegate to each at some time, the entire function of transmitting the full engine-power, that is, they drive by the transformer alone or drive by the coupling alone, with the inevitable consequence that the bulk, weight, and cost of the apparatus were rendered practically prohibitive.

More disadvantageous was the fact that, on changing over from drive by the torque-transformer alone, to drive by the hydraulic coupling alone, or conversely, conditions inevitably arose in which the transformer and/or the coupling were partially emptied of transmission liquid, with the result that indefinite, and usually low, amounts of torque were transmitted, with obvious consequences. The repeated emptying and re-filling, furthermore, invariably mixes air with the liquid, resulting in foaming or frothing of the transmission liquid, thus eventually rendering the apparatus substantially inoperative.

The present invention aims to provide a novel change-speed gear and novel mode of operating same; more particularly, it aims to provide an arrangement whereby the power from the driving shaft will be primarily transmitted by the torque-transformer acting as such, in starting the load on the driven shaft; whereupon the torque-transformer will be transformable into a fluid-coupling and act in augmentation of, or auxiliary to, the action of the true hydraulic-coupling also present.

Other objects and advantages of the invention will become manifest in connection with the following description of several embodiments thereof, illustrated in the accompanying drawings, but the invention is limited in its embodiments only by the scope of the sub-joined claims. In these drawings, Fig. 1 is a vertical central section, partially in elevation, of one embodiment of the invention.

Fig. 2 is a similar view of another modification.

Fig. 2A is a cross-section on line 2A—2A of Fig. 2.

Fig. 3 is a similar view of still another modification.

Figs. 4, 5, and 6 relate to the modification shown in Fig. 3.

Fig. 4 illustrates diagrammatically the shape and the relative position of the impeller, turbine and guide wheel blades; the direction of flow of the fluid, and the speed parallelogram, as prevailing during the start of the torque-transformer.

Fig. 5 is a diagram similar to that shown in Fig. 4, illustrating the conditions at the time of the most efficient operation of the torque-transformer.

Fig. 6 is a diagram similar to that shown in Figs. 4 and 5, illustrating the condition at the time the pressure on the guide blades is reversed, and the torque-transformer is about to act as a coupling.

The apparatus illustrated in Fig. 1 consists of a hydraulic change-speed gear connected to a driving shaft 1, which is operationally connected, for example, to an internal combustion engine, and to a driven shaft 2 which transmits power through reversing gear (not shown) to a vehicle or other driven machine. The gear, which is enclosed within a casing 3, comprises a hydraulic torque-transformer, generally indicated at 4, and a hydraulic coupling, generally indicated at 5. The torque-transformer comprises a twin or double-wheel pump-impeller 6 keyed to the driving shaft 1 and cooperating with a rotor or turbine wheel 7. This turbine wheel 7 is rigidly connected to the driven shaft 2 through housings 8 and 9, and flanges 10. Another rotor or turbine wheel 11, also cooperating with the pump impeller 6 and mounted on a hollow shaft 12, is connectible to the driven shaft 2 by means of a friction clutch 13, housing 9, and flanges 10.

The torque-transformer 4 includes in its operative assembly, a bladed guide-wheel 14. This member can be rendered ineffective on the liquid circulating in the tori when the torque-transformer 4 is operating as an auxiliary hydraulic coupling as hereinafter described. The guide wheel 14 can also be coupled through a friction clutch 15 to the casing 3, which is fixed, a servo-motor 16 being provided for controlling the coupling 15. The friction clutch 13 is similarly controlled by a servomotor 17.

When the parts are in the position shown in Figure 1 the apparatus operates as a torque-transformer. To effect such operation pressure medium is supplied through a pipe 18 so as to move the piston 16 to the right against the action of a control spring 16', thereby moving to the right, as viewed in the drawings, a lever 20 operatively connected to the movable part of the clutch 15. The clutch 15 is thus engaged, and the guide wheel 14 is locked stationary to the stationary casing 3. Power is now transmitted from the shaft 1 to pump impeller 6 and the liquid thereby set in motion centrifugally impinges on the turbine wheel 7, which drives, through the housings 8 and 9, the driven shaft 2, the guide wheel 14 operating to return the fluid to the impeller 6. At the same time a pipe 19 remains open to a discharge (not shown) so that the piston 17 is forced to the right, as viewed in the drawings, by its control spring 17', thereby holding a lever 21 to the right and maintaining the clutch 13 disengaged. The turbine wheel 11 cannot, therefore, transmit any power to the driven shaft 2, and the hydraulic coupling 5 remains inoperative.

When the load has been taken up by the torque-transformer 4, and the speed of the shaft 2 increases, the pipe 18 is opened to a discharge (not shown) and pressure medium is supplied through the pipe 19 against piston 17. The friction clutch 15 is thereupon disengaged while the friction clutch 13 is put into engagement. The guide wheel 14 will now rotate freely. It will therefore be ineffective on the liquid flowing in the circuit, so that the torque-transformer 4 will, in effect act as a hydraulic coupling transmitting power through the housings 8 and 9 to the driven shaft 2, at high speeds. At the same time power will be transmitted from the impeller 6 to the turbine wheel 11 of hydraulic coupling 5 and thence through the clutch 13 to the driven shaft 2. Thus, when guide wheel 14 is unclutched from casing 3, part of the torque is transmitted by the hydraulic coupling 5, and part by the hydraulic torque-transformer 4 now acting as a hydraulic coupling.

In the modification illustrated in Figure 2, there is a guide wheel 14' which normally occupies the position shown in full lines, in which position the apparatus 4 operates as a torque-transformer. Guide wheel 14' is held in this position by the spring of a servomotor 24 and in such position a bladed part 22 on the guide wheel 14' is put into the path of the liquid. When, however, the load has been started and shaft 2 is rotating fast and the torque-transformer 4 is to operate as a hydraulic coupling, pressure medium is supplied through a pipe 25 to the servomotor 24, thereby moving the guide wheel 14' to the left to the dotted line position, and rendering the guide wheel inoperative, since the part 23 thereof, then lying in the liquid circuit, is not provided with blades. Simultaneously pressure medium is supplied to the servomotor 17a, causing the clutch 13 to be moved to the engaged position, thereby causing power to be transmitted by the hydraulic coupling 5 as well as by device 4 operating as a hydraulic coupling.

In the modification illustrated in Figure 3, the commutation or change-over of the apparatus from torque-transformer operation to hydraulic coupling operation is automatic.

The guide wheel 14'' is carried on a hollow shaft 27 which is rotatable on driving shaft 1. Shaft 27 is provided with an external screw thread which is engaged by an internal thread on a nut member 28. Nut 28 carries friction clutch members 40 and 41 which are adapted to engage corresponding conical clutch faces 29 and 30 which are arranged on the turbine wheel 7 and the casing or housing 48, respectively. Nut 28 is further provided with claw clutch members 31' and 32 which engage corresponding claw clutch members 31 and 32 on the turbine wheel 7 and casing 48, respectively.

Briefly explained, the operation of this mechanism of Fig. 3 is as follows:

In the starting of the transmission apparatus and the bringing of driven shaft 2 up to the desired speed, in order to cause the part of the apparatus indicated generally by numeral 4 to operate as a torque-transformer, nut 28 is coupled by means of the claw members 32, 32' to the stationary casing or housing 48, thereby preventing guide wheel 14'' from rotating.

When the speed of the turbine wheel increases, and the pressure of the stream of liquid against the guide wheel blades is reversed, as will be more fully explained hereinafter, the guide wheel is thereby set in rotation and the claw members 32—32' are disengaged. The clutches 30—41, however, are still in frictional engagement so that nut 28, due to the friction, is rotated at a slower rate than is shaft 27, and the nut is thus moved to the right into the position shown in Fig. 3 where claw members 31—31' engage one another. Guide wheel 14'' is thus coupled to turbine wheel 7a and rotates with the same, so that the device 4 now operates as a hydraulic coupling.

The rotatable nut 28 has a groove 33 engaged by a forked member 33' operatively connected to a control valve 34. Pressure medium is supplied through a pipe 35 so that when the torque-transformer 4 is operating as a hydraulic coupling, that is to say, when the nut 28 is in the position shown in the drawings and the guide wheel 14'' is rotating with the rotor 7, pressure medium flows through a pipe 36 to a servo-motor 40 which operates to cause friction coupling 13 to be engaged, thereby connecting the hydraulic coupling 5 to the driven shaft 2. When, on the other hand, the torque-transformer 4 is operating as such, that is to say, with the nut 28 to the left and the guide wheel 14'' fixed to the casing 3, the groove 33 and the valve 34 will be moved to the left, so that the pipe 36 will be in communication with a discharge pipe 37 and pressure medium will be discharged from the servomotor 40 which controls the friction clutch associated with the hydraulic coupling, so that this coupling will be rendered inoperative, i. e., disengaged.

Describing this mechanism more specifically, the hollow shaft 27 carries the guide wheel 14'', and in the position shown in Fig. 3 the coupling cone 29 is frictionally in connection with the turbine wheel 7 and claws 31 and 31' are in positive engagement. The coupling cone 30 is attached to the stationary casing 48 of the mechanism. When hollow shaft 27 rotates relative to the nut 28 the nut is moved along the shaft together with the coupling cones 40 and 41, by means of the gripper bolts 42 and 43. These gripper bolts 42 and 43 are distributed around the periphery of the grooved disc 49 which is integral with, or attached to, the nut 28. The bolts 42 are riveted to the coupling cone 40 and the bolts 43 to the coupling cone 41. Both groups of bolts extend in an axial direction and play in bores in the disc 49 and are provided at their external ends with heads 44 and 45 formed for example as a bolthead in order to restrict the axial movement of the coupling cones 40 and 41 with respect to the body of the nut 28. Over each of the bolts 42 a spring 46 is placed, and over each of the bolts 43 a spring 47 is placed, which springs tend to separate the coupling cones 40 and 41 from the disc 49. The claws or detents 31' and 32' are integral with the body of the member 28, and they engage corresponding counterclutch claws 31 and 32. The counter clutch claws 31 are rigidly connected with the turbine wheel 7 and the counterclutch claws 32 with the casing 48.

Assuming that the turbine wheel 7, if looked at from the driving side (i. e., from the left side) rotates in a positive direction (i. e. counter-clockwise) the threads of the hollow shaft 27 and the nut body 28 must be right-handed. The position of the nut body 28 shown in Fig. 3 corresponds to the hydraulic coupling operation of the hydraulic change speed mechanism where the guide wheel 14" also runs along with the turbine wheel 7 as a turbine.

The automatic change-over of the apparatus of Fig. 3 from torque-transformer operation to hydraulic coupling operation by the reversal of pressure, that is to say, the reversal of the direction of discharge of the liquid from the blades of the turbine wheel 7 against the blades of the guide wheel 14", will be better understood by considering Figs. 4, 5, and 6. These three figures represent developed and diagrammatic views showing the shape and the relative positions of the impeller, turbine and guide wheel blades, the direction of flow of the liquid and velocity parallelograms, as prevailing, respectively, during the starting or torque-transformer operation of the apparatus; during its most efficient operation; and during its change to operation as a hydraulic coupling.

The short arrows in these figures indicate the direction of flow of the liquid. The long arrows indicate, respectively, the peripheral speeds U, the absolute velocities C of the liquid and the relative velocities W of the liquid.

When the device indicated generally by 4 acts as a torque-transformer, that is, when the turbine wheel 7 is stationary, as, for example, before starting (Fig. 4), or when the turbine wheel rotates at a speed considerably lower than the speed of the impeller (Fig. 5), the liquid is directed at varying angles against the concave side of the blades of guide wheel 14". Under continued operation of device 4 as a torque-transformer, the speed of turbine wheel 7 increases and when the impeller 6 and the turbine wheel 7 rotate at nearly the same speed, the liquid is directed against the convex side of the blades of guide wheel 14" (Fig. 6), and the guide wheel commences to rotate in the counter-clockwise direction, that is, in the same direction as the impeller and turbine wheels.

It will be understood that the rotation of guide wheel 14" thus brought about, causes the axial shifting of nut member 28 to the right into the position shown in Fig. 3 so that guide wheel 14", instead of being held in stationary position for torque-transformer operation by the engagement of claw coupling members 32—32' is locked for rotation with the turbine wheel 7 by means of the claw coupling members 31—31'. It will also be understood that this axial shifting of nut member 28 causes the actuation of valve 34 so as to admit pressure fluid to servomotor 40 and thereby cause clutch 13 to be moved to its engaged position so that turbine wheel 11 is clutched to casing 9 and driven shaft 2, and the device indicated generally by numeral 5 thereafter operates as a hydraulic coupling to assist device 4 (now also acting as a hydraulic coupling) in the transmission of power from shaft 1 to shaft 2.

It will further be understood that reverse change-over, that is, the change of device 4 back to operation as a torque-transformer, will also take place automatically if the speed of turbine wheel 7 is reduced appreciably below that of impeller 6. This will be caused by the liquid again being discharged from the turbine wheel against the concave side of the blades of guide wheel 14". If, at the return of pressure from the convex side to the concave side the guide wheel is loose, it begins to rotate in the direction of the turbine wheel and under certain conditions it will even rotate more quickly than the turbine wheel. The relative rotation between the turbine wheel and the guide wheel consequently is reversed when the pressure is changed in direction so that the return of the relative direction of rotation can be utilized for controlling purposes.

If in the coupling position illustrated in Fig. 3 the number of revolutions of the turbine wheel 7 as compared with the number of revolutions of the impeller wheel 6 falls off in such a degree that the pressure of the liquid owing to the change of the speed parallelogram is no longer exerted on the convex side, but on the concave side of the guiding blades, a moment is formed between the turbine wheel and the guide wheel which tends to turn the guide wheel in a negative direction, i. e. in opposition to the direction of the revolution of the turbine. But there is no resistance to such turning, because the thread on the hollow shaft 27 is a right-handed thread. The body of the nut 28, then, is moved to the left.

The coupling cones 29 and 40 remain, during the reversing movement, for the time being in contact with one another under the action of the springs 46, whereas the claw clutches 31 and 31' slide apart. Then coupling cone 30 comes in contact with the coupling cone 41. Intermediate the extreme positions of the nut member 28 a position will occur in which the coupling cones 40 and 29 still are in contact and the coupling cones 30 and 41 also have come in contact. But as in this position the springs 46 and 47 are more or less relaxed, slipping will take place between one or the other pair of cones so that at all events the rotation of the body of the nut which so far had a positive direction, is slowed up by braking at cone 30.

By the pressure of the liquid on the concave side of the guide wheel the hollow shaft 27 is turned in the negative direction, so that the body of the nut 28 is moved farther to the left until the coupling cones 29 and 40 are out of contact, and at length the clutches 32 and 32' will come into engagement. As soon as nut 28 is thus prevented from moving, further turning of the hollow shaft 27 is no longer possible. Guide wheel 14", therefore, is now rigidly connected to the casing or housing 48, thus increasing the torque of the turbine wheel 7 and causing device 4 to act as a torque-transformer.

When the speed of the turbine wheel rises again, the pressure on the guide wheel blades reverses again from the concave side to the convex side. At the same time, a moment is exerted on the guide wheel in a positive direction, so that it, also, begins to rotate in a positive direction like the turbine wheel. With the wheel 14" the hollow shaft 27 also rotates in the positive direction. As, however, the body of the nut 28 is held by the claw clutches 32—32', nut 28 is screwed to the right. The clutches 32—32' then come out of engagement. Thereupon the coupling cones 29 and 40 come into contact.

In this manner the rotation of nut 28 in the positive direction is effected in proportion to the reduction of the coupling pressure between the cones 30 and 41 on one hand, and the increase in the coupling pressure between the cones 29 and 40 on the other hand. The positive speed of rotation of the body of the nut 28 begins to rise. As, however, owing to the form of the blades, the guide wheel rotates faster than the turbine wheel, nut 28 is shifted farther to the right until claw clutches 31—31' go into engagement, and thereupon the guide wheel rotates with the same number of revolutions as the turbine wheel. Then the position is attained again which is shown in Fig. 3.

It is to be understood that the constructions described above are given by way of example only and various refinements and changes within the scope of the appended claims are contemplated.

I claim:

1. An apparatus for the hydraulic transmission of power, comprising a driving shaft, a driven shaft, two impeller wheels fixed on said driving shaft, a turbine wheel and a guide wheel adapted to coact with one of said impeller wheels to form a torque-transformer, said turbine wheel being connected to the driven shaft, a second turbine wheel adapted to coact with said driven shaft and with the other of said impeller wheels to form a coupling, means for rendering said coupling inoperative during the operation of the torque-transformer, and means for converting said torque-transformer into an auxiliary coupling during the operation of the coupling.

2. An apparatus for the hydraulic transmission of power, comprising a driving shaft, a driven shaft, two impeller wheels fixed on said driving shaft, a turbine wheel and a guide wheel adapted to coact with one of said impeller wheels to form a torque-transformer, said turbine wheel being connected to said driven shaft, a second turbine wheel adapted to coact with said driven shaft and with the other of said impeller wheels to form a coupling, means for rendering said coupling inoperative during the operation of the torque transformer, and means for rendering said guide wheel inoperative and thus to convert said torque-transformer into an auxiliary coupling during the operation of the coupling.

3. An apparatus for the hydraulic transmission of power, comprising a driving shaft adapted to be connected to a source of power, two impeller wheels fixed on said driving shaft, a driven shaft, a turbine wheel arranged adjacent one of said impeller wheels and connected to the driven shaft, a stationary guide wheel arranged between said turbine wheel and said impeller wheel, said turbine wheel and guide wheel coacting with the impeller to form a torque-transformer, means adapted to render said guide wheel inoperative by rendering the same freely rotatable with said driven shaft thereby converting said torque-transformer into a hydraulic coupling, a second turbine wheel arranged to coact with the other of said impeller wheels to form a hydraulic coupling to supplement the coupling action of the torque-transformer, and means adapted to connect and disconnect said second turbine wheel and said driven shaft.

4. An apparatus for the hydraulic transmission of power, comprising a driving shaft adapted to be connected to a source of power, two impeller wheels fixed on said driving shaft, a driven shaft, a turbine wheel adapted to coact with one of said impeller wheels, said turbine wheel being connected to said driven shaft, a guide wheel having blades arranged in the path of the liquid flowing between said turbine wheel and one of said impeller wheels, means adapted to render said guide wheel inoperative by displacing it bodily to remove its blades from the path of the liquid delivered by said impeller wheel, a second turbine wheel adapted to coact with the other of said impeller wheels, and means adapted to couple said second turbine wheel to said driven shaft.

5. An apparatus for the hydraulic transmission of power, comprising a driving shaft adapted to be connected to a source of power, two impeller wheels fixed on said driving shaft, a driven shaft, a turbine wheel arranged to coact with one of said impeller wheels said turbine wheel being rigidly connected to said driven shaft, a guide wheel arranged to be held against rotation and to coact with said turbine wheel and said impeller wheel, said turbine wheel and said guide wheel coacting with the impeller to form a torque-transformer, means adapted to render said guide wheel inoperative by locking the same to said turbine wheel thereby converting said torque-transformer into a hydraulic coupling, a second turbine wheel adapted to coact with the other of said impeller wheels to form a coupling to supplement the coupling action of the torque-transformer, and means to connect and disconnect said second turbine wheel and said driven shaft.

6. In a device as in claim 5, means for automatically rendering the guide-wheel inoperative and operative in accordance with the varying impingement-action of the liquid current on the guide wheel.

7. In a device as in claim 5, means for automatically rendering the guide-wheel inoperative and operative in accordance with the varying impingement-action of the liquid current on the guide wheel by locking the guide wheel selectively to the first turbine wheel and to a stationary part of the structure.

8. An apparatus for the hydraulic transmission of power, comprising a stationary casing, a driving shaft, two impeller wheels fixed on said driving shaft, a driven shaft, a turbine wheel adapted to coact with said impeller, said turbine wheel being connected to said driven shaft, a guide wheel arranged between said turbine wheel and one of said impeller wheels, a second turbine wheel adapted to coact with the other of said impeller wheels, a clutch coupling said second turbine wheel to said driven shaft, means for locking said guide wheel to said first turbine wheel and simultaneously causing the engagement of said clutch, means for locking the guide wheel to said stationary casing and simultaneously causing the disengagement of said clutch.

9. An apparatus for the hydraulic transmission of power, comprising a driving shaft, two impeller wheels fixed on said shaft, a driven shaft, a turbine wheel adapted to coact with one of said impeller wheels said turbine wheel being connected to said driven shaft, a guide wheel arranged to coact with said turbine wheel and said impeller to form a torque-transformer, said wheel including a bladed portion and an unbladed portion, means for axially moving said wheel to insert said bladed portion in the liquid circuit of said torque-transformer and to withdraw it from the same, a second turbine wheel coacting with the other of said impeller wheels to form a coupling, and means for connecting said second turbine wheel to said driven shaft during the insertion of said unbladed portion of said guide wheel in the liquid circuit of said torque-transformer.

10. In a hydraulic transmission, a fixed casing, a driving shaft connected to a source of power, an impeller fixed on said driving shaft, a first turbine wheel coacting with the impeller and connected to a driven member, and a second turbine wheel coacting with the impeller, a guide member coacting with the first turbine wheel, mechanism for locking the guide member to said fixed casing automatically in response to an appreciable reduction in speed of said first turbine wheel below that of the impeller so as to increase the torque, said mechanism also operating to release said guide member automatically in response to an increase of the speed of the first turbine wheel to the neighborhood of or above that of the impeller so as to cause the driven member to be driven by the first turbine wheel, and means for connecting and disconnecting the second turbine wheel and the driven member, said means being operable to connect said second turbine wheel and the driven member substantially simultaneously with the locking of the guide member to the fixed casing, and said means being operable to disconnect the second turbine wheel and driven member substantially simultaneously with the releasing of said guide member.

11. An apparatus for the hydraulic transmission of power, comprising a stationary casing, a driving shaft adapted to be connected to a source of power, two impeller wheels fixed on said driving shaft, a driven shaft, a turbine wheel arranged to coact with one of said impeller wheels and connected to said driven shaft, a guide member arranged to coact with said turbine wheel and said impeller wheel, means for locking said guide member alternatively to said turbine wheel and to said stationary casing, said means comprising a threaded sleeve surrounding said driving shaft, a nut rotatable on said sleeve, coupling-members on said nut, said coupling-members being adapted to engage similar members provided on said turbine wheel and on said stationary casing, clutch-members provided on said nut, said clutch-members being adapted to engage complementary clutch faces provided respectively on said turbine wheel and said stationary casing, a valve arranged to be actuated by the axial movement of said nut member, a second turbine wheel connectible through a clutch to said driven shaft, a servomotor operatively connected with said clutch, said servomotor being controlled by said valve, whereby the axial movement of said nut member effects the alternative locking of said guide wheel to said casing and said turbine wheel and the simultaneous actuation of the clutch for said second turbine wheel.

12. An apparatus for the hydraulic transmission of power comprising a driving shaft, a driven shaft, two impeller wheels fixed on said driving shaft, a turbine wheel and guide wheel adapted to coact with one of said impeller wheels to form a torque-transformer, said turbine wheel being connected to the driven shaft, a second turbine wheel adapted to coact with the other of said impeller wheels to form a coupling, clutch mechanism for fixing said guide wheel against rotation during torque-transformer operation, and a second clutch mechanism for disconnecting said second turbine wheel from said driven shaft during such operation.

13. An apparatus for the hydraulic transmission of power comprising a driving shaft, a driven shaft, two impeller wheels fixed on said driving shaft, a turbine wheel and a guide wheel adapted to coact with one of said impeller wheels to form a torque-transformer, said turbine wheel being connected to the driven shaft, a second turbine wheel adapted to coact with the other of said impeller wheels to form a coupling, clutch mechanism for fixing said guide wheel against rotation during torque-transformer operation, a second clutch mechanism for connecting said second turbine wheel to said driven shaft during coupling operation, and means for actuating said first clutch mechanism to engaged position and simultaneously actuating said second clutch mechanism to released position to cause the apparatus to operate as a torque-transformer, and for simultaneously actuating said clutch mechanisms to respectively opposite positions to cause the apparatus to operate as a coupling.

14. An apparatus for the hydraulic transmission of power comprising a driving shaft adapted to be connected to a source of power, two impeller wheels fixed on said driving shaft, a driven shaft, a turbine wheel connected to said driven shaft and adapted to coact with one of said impeller wheels, a guide wheel arranged in the path of the liquid flowing between said turbine wheel and its impeller to form a torque transformer, said guide wheel being bodily shiftable to remove its blade from the path of the liquid, a second turbine wheel adapted to coact with the other of said impeller wheels, clutch mechanism for locking the second turbine wheel to said driven shaft when the apparatus is to act as a coupling, and means for simultaneously shifting the guide wheel to remove its blades from the path of the liquid and for actuating said clutch mechanism to engaged position to convert the operation of said apparatus from that of a torque transformer to that of a coupling.

HEINRICH WÄLTI.